United States Patent [19]

Taylor

[11] E Patent Number: Re. 33,104

[45] Reissued Date of Patent: Oct. 31, 1989

[54] ROCK CLIMBING ADJUSTABLE CHOCK

[76] Inventor: Peter C. Taylor, 1222 N. DeJoy St., Santa Maria, Calif. 93454

[21] Appl. No.: 96,920

[22] Filed: Sep. 14, 1987

Related U.S. Patent Documents

Reissue of:

[64] Patent No.: 4,575,032
Issued: Mar. 11, 1986
Appl. No.: 719,990
Filed: Apr. 4, 1985

[51] Int. Cl.[4] ..... A47G 29/00

[52] U.S. Cl. ..... 248/231.2; 248/231.9; 248/925

[58] Field of Search ..... 248/1, 231.9, 231.2; 294/86.24, 86.25, 86.16, 86 R, 95, 97; 411/913; 52/166; 405/259

[56] References Cited

U.S. PATENT DOCUMENTS

| | | | |
|---|---|---|---|
| 813,384 | 2/1906 | Kiefer | 294/95 |
| 2,262,811 | 11/1941 | McDaniels | 294/97 |
| 2,809,070 | 10/1957 | Nelson | 294/97 |
| 2,951,725 | 9/1960 | St. Jean | 294/97 |
| 3,519,304 | 7/1970 | Shores | 294/97 |
| 3,877,679 | 4/1975 | Lowe | 248/1 |
| 3,903,785 | 9/1975 | Pepper | 248/1 |
| 4,069,991 | 1/1978 | Saunders et al. | 248/1 |
| 4,074,880 | 2/1978 | Simond | 248/1 |
| 4,083,521 | 4/1978 | Greiner | 248/1 |
| 4,184,657 | 1/1980 | Jardine | 248/1 |

*Primary Examiner*—J. Franklin Foss
*Attorney, Agent, or Firm*—Owen, Wickersham & Erickson

[57] ABSTRACT

An adjustable chock having a biforcated handle (20) with a shaft (30) tensionally positioned between the forks in closed loop fashion. Three opposed cams (34) with teeth on the periphery are positioned on the shaft (30) and spring loaded to rotate to their widest point of separation. A pull rod (40) is slideably located within a slot (28) in each fork of the handle (20) with a connecting link (42) pivotally attached on one end to the link and on the other to the cam (34). When the pull rod (40) is manually retracted, the cams (34) are rotated to their minimum width for insertion into a rock fissure and when released spring loadingly return to the open position for gripping the internal surface in a chock like manner.

14 Claims, 2 Drawing Sheets

ROCK CLIMBING ADJUSTABLE CHOCK

Matter enclosed in heavy brackets [ ] appears in the original patent but forms no part of this reissue specification; matter printed in italics indicates the additions made by reissue.

TECHNICAL FIELD

The invention relates to anchor related climbing aids having adjustable means in general, and more specifically to a multiple cammed spring loaded climbing anchor with remote retraction means.

BACKGROUND ART

Prior art is replete with anchor devices to be used by ricj ckimbers to secure a hold within the crack of a rock and allow removal after use. A search of the prior art did not disclose any patents that read directly on the claims of the instant invention, however, the following U.S. patents are considered related.

| U.S. Pat. No. | Inventor | Date Issued |
|---|---|---|
| 4,184,657 | Jardine | Jan. 22, 1980 |
| 4,074,880 | Simond | Feb. 21, 1978 |
| 4,069,991 | Sanders et al | Jan. 24, 1978 |
| 3,903,785 | Pepper, Jr | Sept. 9, 1975 |
| 3,877,679 | Lowe | Apr. 15, 1975 |

Jardine teaches a climbing aid having many of the same elements as the instant invention, such as a support bar having a longitudinal slot and an attachment point near the end. A pair of spring loaded opposed cams supported on a spindle and an operating bar attached to the cams provide the locking arrangement. A pair of wires, with one section rigid, are attached to an operating bar supplying the adjustment and retracting features allowing the climbing aid to be placed into a fissure or crack. It will be noted that this type of device utilizes only a single support bar with a square end and the spindle is supported only in the middle structurally through the bar near the opposite end. No provision is made to hold the operating bar into the longitudinal slot in any direction with the flexible wires being the containment, however, not lending any lateral support at all. The shape of the cams is important to consider as the radial section does not extend beyond a 90 degree angle when fully extended. With this prior art in mind, it is the purpose of the instant invention to improve this type of device in strength and functional operation.

Simond teaches a plurality of wedges that may be used in concert, each having its own attaching holes for ropes to pass therethrough.

Sanders et al similarly disclose a chock having a unitary body with a pair of holes on one side with mating slots on the other. Their invention has three sides and beveled end faces to allow camming action on various sides and also the ends.

Pepper, Jr. employs a three piece mechanism that interlocks outer parts and utilizes a wedge shaped expander. When tension is applied to an inner member the two coacting outer parts are forced apart and a loop of cable transmits an axial load from the wedge, as all the parts are attached together.

Lowe teaches a chock that utilizes one main body member in wedge shape with an orientation assembly pivotally attached between a pair of spaced surfaces. The two members are spring loaded together forcing the pair apart into the crack or fissure. The main body member is provided with an arcuate cam surface arranged to present a constant intercepting angle with respect to the surface upon which it abuts. The arrangement, therefore, functions as a levering cam apparatus when placed within a crack or crevice in a rock surface.

DISCLOSURE OF THE INVENTION

The instant invention is directed to an improvement on the device as taught by Jardine in U.S. Pat. No. 4,184,657. While Jardine's apparatus has been accepted to fill the need for a device having opposed action of a plurality of cams, many areas lack functional capabilities and possess limitations heretofore not considered.

It is, therefore, a primary object of the invention to provide a climbing aid with an operating bar that is self-centering. Jardine's device is a single keeper bar that has a tendency to pull angularly from one side to the other and as the attachment to the cam is a wire rope that is flexible allowing the bar to be jammed on one side or the other if not carefully pulled back evenly. The instant invention, on the other hand, uses a bar attached on both sides of a yoke that is separated with retaining rings on each side. This maintains a self-aligning feature preventing the bar from jamming and allowing the bar to be pulled from a single side in a restricted or difficult area of application. In actual use this problem that prior art has of jamming or catching the operating bar within the longitudinal slot, provides a long felt need for improvement. Simply placing a retainer on each side of the support bar as an obvious expedient would not provide sufficient width to allow free movement without digging the retainer into one side or the other of the single rectangular bar handle.

It is, therefore, another object of the present invention to utilize a yoke with two separate sides instead of the single bar of Jardine. This yoke provides a pair of slots with the pull rod slideably installed therein captivated on each end by a retainer in a groove. Inasmuch as the retainers are now spread apart and the connection is therebetween, the tendency to pull on one side of the bar or the other is completely eliminated. Not only does this improvement satisfy this need, the yoke by itself increases the structural integrity of the entire assembly. Since this apparatus is life supporting when in use strength becomes an important factor to be considered. By the use of a "U" shaped yoke, one of the cams may be omitted, narrowing the gripping surface allowing further flexibility in tight faults or irregular shaped fissures encountered by rock climbers using this device. No strength is forfeited, as only a pair of Jardine's cams actually take the load, since the angle of the support bar in relation to the spindle dictates the mechanical preference.

A yoke has further advantages in that the spindle is supported on either side not just in the center forcing the spindle to be cantilevered on both ends. The bearing load on a yoke is in tension or compression between two fixed surfaces as a simple beam, whereas a unitary support bar is directed to a cantilever beam with the load concentrated on the free end.

An important object of the invention is the ease of operation. Prior art required the cams to be retracted by placing the rectangular end of the support bar against the installers palm while the fingers grip the operating bar. The cams are retracted against spring pressure transmitting the compressive force directly upon the relatively small rectangular end impinged upon the palm. Not only is this operation awkward, but the end may slip from the palm, or in some instances must be released after a short time due to excessive pressure causing discomfort to the user. The instant invention, on the other hand, incorporates a palm shaped handle end with extended surfaces on both sides conforming to the palm area of ones hand, also extended ends line up with the pull rod making the compressive force linear on both ends. The degree of retraction is also easily controlled by the instant invention, as pressure may be exercized on either end of the pull rod against the mating handle allowing the device to be partially retracted with ease while being positioned into a crevice in the rock surface.

Still another object reduces the number of moving parts from eleven of Jardine to eight of the applicant. This simplification improves reliability in operation and enhances the cost relationship, as most of the individual parts require machining of some type during the manufacturing process.

Yet another object of the invention eliminates the use of cables, or wire rope, which are replaced by solid actuating arms. The advantage of these arms allow individual cams to be pushed forward to the open position if needs require this action from the external end of the apparatus, such as when the device is partially inserted into a crack. The slots in the solid arms still allow an individual cam to be retracted further than the remaining two or vice versa, as the case may demand.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 8:
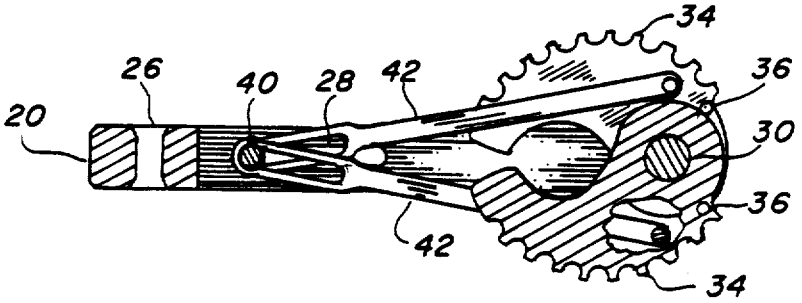
FIG. 8 is a cross-sectional view of the preferred embodiment taken along lines 8—8 of FIG. 2, except the cams are in the retracted position.

The best mode for carrying out the invention is presented in the terms of the preferred embodiment. This preferred embodiment, as shown pictorially in FIGS. 1–8, is comprised of a biforcated yoke handle 20 having a counterbored hole 22 in each fork near the inside extended end. The other end where the forks join is palm shaped with extending fingers 24 on each side. An attaching cavity 26 is located through this end at the center between the fingers 24. This cavity 26 is countersunk on each side, as shown in FIG. 8, and allows a rock climbing extension, such as a sling rope or carabiner to be attached securely to the device. The handle 20 is flat on the top and bottom surface and the forks are formed outwardly in parallel relationship in a "U" shape with the outermost extended ends raised radially from the surface.

A slot 28 is disposed within each of the legs in planar relationship running parallel to each side along with the top and bottom surface. The yoke 20 may be fabricated of any structural material, such as steel, magnesium, plastic or aluminum, with reinforced nylon being preferred. It may be either cast or machined out of parent material, as desired by the manufacturing process.

A shaft 30 is tensionally positioned between the forks of the yoke 20 within the counterbored holes 22. The shaft 30 is round and closely related in diameter to the hole 22 allowing a tight fit therebetween. In order to install the shaft, the forks are forced open and the shaft inserted allowing the yoke to spring back into place with the shaft 30 retained therein. Each end of the shaft 30 is hollow and receives an expansion rivet 32 that passes through the counterbored hole 22 into the shaft locking it permanently into place. The shaft, therefore, does not rotate but becomes a structural member tieing the forks together on each end forming a type of closed looped shape frame. A plurality of opposed cams 34 are rotatably positioned on the shaft 30, prior to assembly, and at least one is pivoted in one direction and at least a pair of pivoted in the opposite direction, preferably three in total. These cams 34 are flat and have an arcuate surface at right angles to a pivotal opening through which the shaft 30 extends. On the outside edge away from this opening the cam 34 contains a plurality of teeth formed as semi-circles in spaced relationship that act as a gripping surface to the inner surface of a rock fissure. The cams 34 are arcuate in shape and the outside surface with the teeth extend over a minimum of 120 degrees from the pivot point. Preferably all three opposed cams 34 are identical in configuration, but are placed in opposition upon the shaft 30 with a pair on the outside positioned in one direction and the center cam 34 in the other direction. A stop 36, in the form of a pin, is located in such a manner as to matingly abut with each other when the cams 34 are rotatably extended, limiting the travel to a fully open position with the cams 34 at a maximum radial separation. These stops 36 are best illustrated touching in the open position in FIG. 3, and extended apart in the retracted position in FIG. 8. The stop 36 may be a round pin of any type sized to be pressed into a mating hole in the cam 34. Preferably the stop 36 is a roll pin formed from a flat sheet of metallic material, such as low carbon steel, or stainless steel rolled into a round configuration with a small gap left between the edges to springingly hold the pin into a round hole. This stop 36 is pressed into the cam 34 flush with one side and extending outwardly on the other on the outside cams and extending on both sides on the middle cam 34. This arrangement allows a contiguous relationship with all three cams 34 in the cam extended position.

A plurality of torsional springs 38 are disposed upon the shaft 30, also prior to assembly. The ends of this spring 38 are pivotally affixed to the inside surface of the cam 34 with each spring placed between two cams. This arrangement spring loads each cam 34 to be urged toward the extended position, allowing opposed action of the gripping members. With these springs the cams 34 opposingly grip the surface of a crack or crevice when the assembly is placed therein.

A pull rod 40 is slideably disposed within the slots 28 in the forked handle 20. This rod 40 extends beyond the handle 20 sufficiently to be grasped with a persons fingers, one on each side, and is sized slightly smaller than the slot 38, allowing a freely sliding fit in a horizontal direction forward and aft from the handle end. The rod 40 is round with the ends chambered for ease of handling. Near the outside surface of the handle 20 a groove is located in each side of the rod 40 with a retaining ring 44 frictionally attached thereon. The retaining ring 44 is metallic and is well known in the art as used in confinement of conventional shafts. This ring 44 snaps into place on each end and is self-supporting within the groove. The particular location of the ring 44 allows the rod 40 to be slideably contiguous with the outside surface of the handle 20, thereby abrogating binding when moved back and forth within the slot 28.

Each cam 34 contains a connecting link 42 that has one end pivotally mounted on the cams inside flat peripheral surface and the other end slideably joined to the pull rod 40. The link 42 is also of metallic construction with a hole in one end for attaching to the cam 34 with a fastener, such as a rivet. A slot is provided in the other end sized slightly larger than the rod 40 allowing free movement thereupon. The slot in the link 42 allows each cam 34 to be pulled forward simultaneously, however, if one or more do not require the same degree of rotation, due to the configuration of the crevice, they may operate independent of the others.

In another embodiment, the cam 34, the stop 36 and the connecting link 42 may be formed of an injection molded thermoplastic material rather than separable metallic elements.

Figure 1:
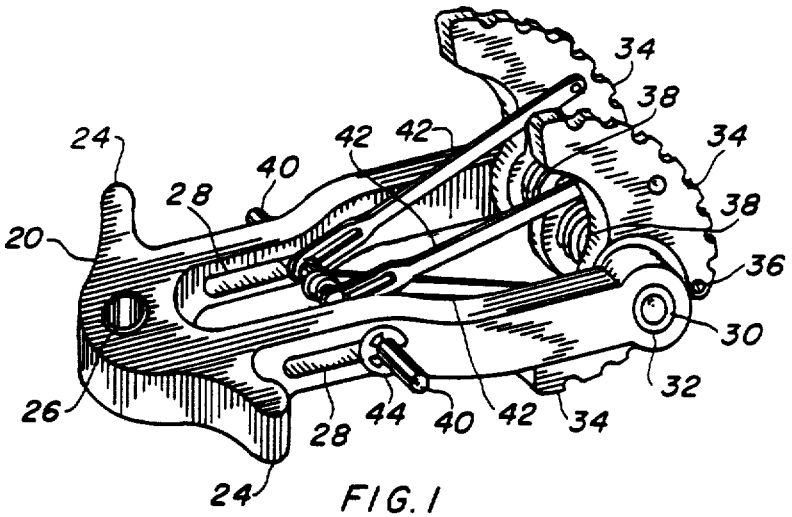
FIG. 1 is a partial isometric drawing of the preferred embodiment with the cams in the at rest position.
Figure 2:
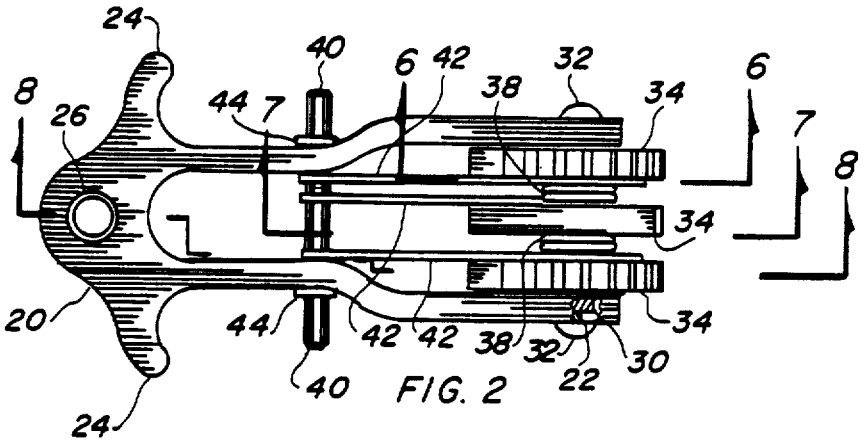
FIG. 2 is a plan view of the preferred embodiment in the same position.
Figure 3:
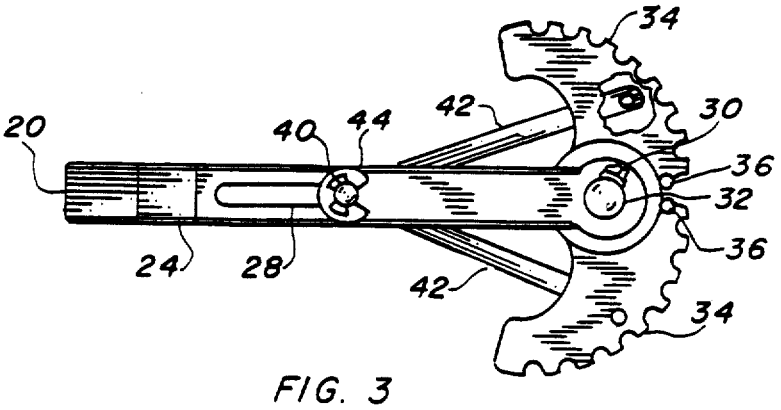
FIG. 3 is a side elevational view of the preferred embodiment.
Figure 4:
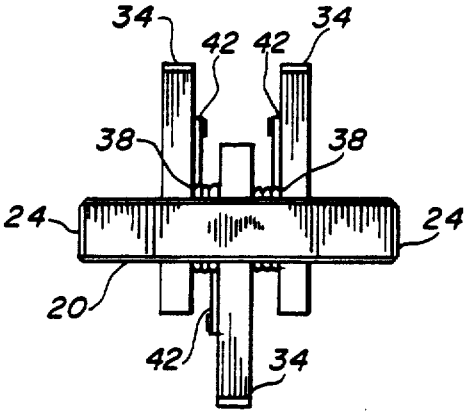
FIG. 4 is an end view of the preferred embodiment taken from the handle end.
Figure 5:
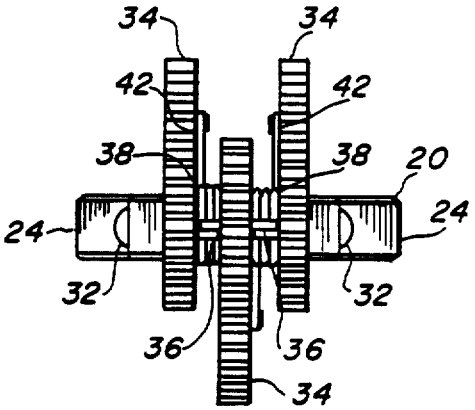
FIG. 5 is an end view of the preferred embodiment taken from the cam end.
Figure 6:
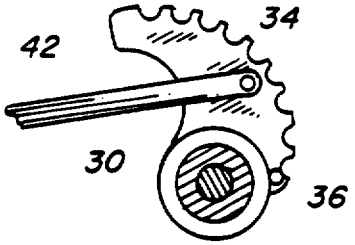
FIG. 6 is a partial cross-sectional view taken along lines 6—6 of FIG. 2.
Figure 7:
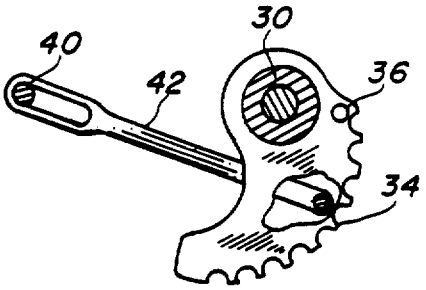
FIG. 7 is a partial cross-sectional view taken along lines 7—7 of FIG. 2.

To operate the invention, the user attaches a line or carbiner into the cavity 26 then pulls the rod 40 toward the handle end 20 with his fingers while the end is contained in his palm. This movement retracts the cams 34 to their minimum width, as shown in FIG. 8. The device is then positioned within a crack or fissure in the surface of a rock and the rod 40 is released. The cams 34, by action of the spring 38, rotate to their maximum width, as shown in FIG. 3, and wedge between the inside surfaces of the crack. As previously mentioned, all of the cams 34 need not expand to the same position, instead they stop at a location dictated by the contour of the fissure remaining tightly jammed into the surface. The climber then pulls on the handle to set the teeth on the cams 34 into the rock then attached to the device with a carabiner or the like. The device remains in the fissure as a security measure if the climber falls. In this event, the apparatus arrests the fall as pressure is instantly exerted on the handle area 20, the cams 34 through the shaft 30 spread apart to a maximum extent accommodating the shock load created by gravity upon the falling body.

When the necessity for the utility has ceased, the invention may be removed by the climber, or his companion, by pulling the rod 40, again disconnecting the wedge-like device from its captivated environment.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A rock climbing adjustable chock of the type having opposed pivotal cams the improvement comprising:

(a) a biforcated yoke handle having a counter-bored hole in each fork on the first end and a palm shaped second end with opposed extending fingers, each fork having a slot in parallel planar relationship;

(b) a shaft tensionally positioned between said forks of the handle, each end urgingly supported within said counterbored holes;

(c) a plurality of opposed cams rotatably positioned on said shaft at least one pivoting in one direction and at least a pair pivoting in the opposite direction, for gripping the inside surface of a crack in a rock;

(d) a plurality of torsional springs disposed upon said shaft with each end pivotally fixed to said cam urging opposed rotation thereof;

(e) a pull rod slideably disposed within said slot in each fork free to move transversely fore and aft, providing a gripping surface for actuation of said chock; and, (f) a plurality of connecting links, each link freely reciprocable having one end pivotally mounted on the periphery of said cam and the other end slideably joined to said pull rod for retractably rotating said spring loaded opposed cams when sliding said pull rod toward said palm shaped yoke end while being inserted into an open rock fault, further providing an adjustable device to which a climbing rope may be attached to arrest a fall.

2. The apparatus as recited in claim 1 further comprising: said yoke handle having an attaching cavity therethrough disposed within said palm shaped second end providing a mounting location for a rock climbing rope to be joined thereupon.

3. The apparatus as recited in claim 1 wherein said shaft is permanently fastened to said handle with an expansion rivet in each end positioned within said counterbored holes.

4. The apparatus as recited in claim 1 wherein said opposed cams further comprise; a plurality of teeth on the outside edge in spaced relationship for gripping onto the interstice of a crack in a rock.

5. The apparatus as recited in claim 4 further comprising; a stop extending from the surface of said cam in such a location as to matingly abut with each other when rotated at a full open position providing a stop therebetween.

6. The invention as recited in claim 5 wherein said stop further comprises; a roll pin pressed into said cam flush with one side and extending outwardly on the other in contiguous relationship with said cams positioned on said shaft.

7. The apparatus as recited in claim 1 further comprising a locking ring retained within a groove on said pull rod on each end proximal to said slot in the forks slideably contiguous with the outside surface for retaining the rod within the slot while allowing movement therewithin.

*8. A rock climbing adjustable chock of the type having opposed pivotal cams the improvement comprising:*

*(a) a bifurcated yoke handle having a hole in each fork on the first end and a second end;*

*(b) a shaft tensionally positioned between said forks of the handle, each end urgingly supported within said holes;*

*(c) a plurality of opposed cams rotatably positioned on said shaft, at least one pivoting in one direction and at*

*least a pair pivoting in the opposite direction, for gripping the inside surface of a crack in a rock;*

*(d) a plurality of torsional springs disposed upon said shaft with each end pivotally fixed to said cam urging opposed rotation thereof;*

*(e) a pull rod slideably disposed relative to each fork and free to move transversely fore and aft, providing a gripping surface for actuation of said chock; and;*

*(f) a plurality of connecting links, each link freely reciprocable having one end pivotally mounted on the periphery of said cam and the other end slidably joined to said pull rod for retractably rotating said spring loaded opposed cams when sliding said pull rod toward said second yoke end while being inserted into an open rock fault, further providing an adjustable device to which a climbing rope may be attached to arrest a fall.*

*9. The apparatus as recited in claim 8 wherein said yoke handle has an attaching cavity therethrough disposed within said second end providing a mounting location for a rock climbing rope to be joined thereupon.*

*10. The apparatus as recited in claim 8 wherein said shaft is permanently fastened to said handle with an expansion rivet in each end positioned within said holes.*

*11. The apparatus as recited in claim 8 wherein said opposed cams further have a plurality of teeth on the outside edge in spaced relationship for gripping onto the interstice of a crack in a rock.*

*12. The apparatus as recited in claim 11 further comprising; a stop extending from the surface of said cam in such a location as to matingly abut with each other when rotated at a full open position providing a stop therebetween.*

*13. The invention as recited in claim 12 wherein said stop further comprises: a roll pin for each said cam flush with one side and extending outwardly on the other in contiguous relationship with said cams positioned on said shaft.*

*14. The apparatus as recited in claim 8 further comprising a locking means on said pull rod on each end slidably contiguous with the outside surface of the forks for retaining the rod on said forks while allowing movement therewithin.*

* * * * *